Patented Mar. 6, 1945

2,370,695

UNITED STATES PATENT OFFICE 2,370,695

PRODUCTION OF SUPEROPAQUE VITREOUS ENAMELS

Paul C. Stufft, Baltimore, Md., assignor to Pemco Corporation, a corporation of Maryland No Drawing. Application June 21, 1940, Serial No. 341,779

3 Claims. (Cl. 106—48)

The present invention relates to the production of enameling and/or ceramic glaze frits whereby the opacity of the resultant product is materially improved and closely controlled, and more particularly to the preparation of enameling and/or glaze frits of a type wherein the opacity is produced by crystallites dispersed through the frit by the process of devitrification or crystallization.

In the enameling of sheet iron and steel articles it has long been realized that the enamel coating should be highly resistant to failure from mechanical impact, distortion of the enameled shape and the strains due to assembly, shipping, and daily use. At the same time the opacity or diffuse reflectance of the enameled articles must be as high as possible in order to present a pleasing white appearance.

In the past it has been exceedingly difficult to produce porcelain enameled and glazed ware meeting all of these criteria. If, for example, the coating be applied sufficiently thin to have a maximum resistance to mechanical abuse, the opacity or covering power of the enamel is reduced markedly, making necessary the use of a high percentage of expensive mill-added opacifying materials. If, on the other hand, the porcelain enamel or glaze coating, even with the high mill opacifier addition, be applied sufficiently heavy to give the desired covering power and whiteness, the thickness of the coating is increased to such an extent as to give rise to a considerable loss due to mechanical failure during the enameling or assembling operations, or in shipping, or in general use. The porcelain enamel frit in general commercial use today derives its opacity or covering power in two ways; first, through the formation of insoluble crystals due to reaction in the smelting operation; and second, through the addition of so-called mill-added opacifiers. The opacity of a porcelain enamel glass depends upon the diffusion through the glassy matrix of a large number of minute particles of materials of markedly greater or lesser optical density than said matrix. More specifically, the present day commercial enamel depends for its opacity upon the addition of fluoride-bearing materials as, for example, cryolite, fluorspar or sodium silicofluoride, which have lower indices of refraction than the glassy matrix which, of course, comprises the body of the enamel glass. At the same time, antimony and/or its compounds, for example, antimony trioxide or sodium antimonate, are added, these being materials of greater indices of refraction than the glass. During the smelting operation these materials form reaction products insoluble in the enamel glass. The nature of said insoluble products is not definitely known. However, the particles form during the initial phase of the smelting operation so that the porcelain enamel glass issuing from the smelter has approximately the same basic opacity or covering power, if drawn directly from the smelter, as the final product after same has been quenched in water. The opacity present in enamels produced with this type of opacification is limited by the amount of opacifying material which may be added to the glass without injuring its physical properties.

In other words, the introduction of excessive amounts of opacifying materials may give rise to enamel glass of unpleasant surface texture lacking in gloss and surface hardness, or in enamels of improper composition for application to sheet steel or iron.

It has been known for many years that enamels may also be prepared which derive their opacity through the supersaturation of the molten matrix with the opacifying agent, and its subsequent reprecipitation or crystallization on the cooling of the enamel frit. The preparation of enamels of this type of opacification has been so difficult that their commercial use has not been deemed practical, except in minor cases where expense of manufacture was not a material consideration. For example, if the reprecipitated crystalloids are too large or improperly diffused through the enamel, a mottled appearance results which is extremely unpleasing to the eye and results in an unsalable product. If, on the other hand, the crystalloids are too small or too few, the opacification power of the enamel is greatly reduced. Enamels of this type of opacification, if taken from the smelter before quenching, produce a practically clear, transparent glass. However, the water quenched material shows the development of considerable opacity which is further augmented during the firing operation of the enameling procedure. It has been found that in order to gain the greatest final opacity or covering power with this type of enamel, the enamel frit or comminuted glass resulting from the quenching operation should give the maximum possible opacity. Examples of this type of porcelain enamel are found in those which are opacified by compounds of arsenic and zirconium. Arsenic opacified enamels have been used for many years in the jewelry industry, but due to the poisonous nature of the major opacifying component; that is, the oxides of arsenic, and the very expensive and complicated manufacturing procedure required to obtain a salable enamel, their use on sheet steel has been deemed commercially impractical up to the present time. The use of zirconium opacified enamels is also well known, as is the fact that it has been recently possible to produce enamel frit compositions of superior opacity and physical properties to the fluoride and antimony opacified enamels, that is, enamels which may be applied at the very low application weights required for greatest mechanical strength, while at the same time offering adequate opacity without the use of large amounts of expensive mill added opacifiers. However, up to the present time it has not been possible to produce enamel frits of this type of sufficient uniformity for satisfactory commercial use. Using the same raw batch mixture a series of finished enamels may show a variation of as much as from 5% to 7% in diffuse reflectance, making a large part of the product because of its varying opacification properties, commercially unsalable. This defect has limited the production and use of this type of zirconium opacified enamel. Furthermore, enamel frits of this type, when milled and applied to sheet steel, show wide variations in opacity with increased firing. For example, the application of a light additional coating of the enamel and subsequent refiring of same in order to repair a defective or damaged article results in a great gain in opacity, giving the so-treated article such an increased reflectance or opacity as to make it commercially unsalable. This phenomenon is not encountered with antimony opacified enamels of the type above referred to wherein any increase of opacity is in direct ratio of thickness of the coating applied rather than the combination of increased coating and additional firing.

It has been discovered that by controlling the temperature at which the zirconium opacified molten vitreous-bearing material is quenched, there may be produced zirconium frits of uniform opacifying power, said frits also having an increased opacifying power as compared to the zirconium opacified frits of the prior art which may be designated for purposes of discussion normal zirconium opacified enamels. It has also been discovered that by controlling the temperature of the quenching medium in which the molten zirconium opacified frit forming material is quenched, said temperature being considerably higher than that normally hitherto used for the quenching of zirconium frits, that the so quenched zirconium frit does not exhibit any wide variation in its refired opacity, or, stated differently, maintains its uniform opacification properties upon continued heating or firing and reheating or refiring. It has also been discovered that zirconium opacified enamels which one would expect would be annealed when employing a quenching temperature of 160° or higher, not only are not annealed, but that the frit maintains a uniform opacity upon firing and refiring.

More specifically, it has been discovered that a new zirconium opacified frit, having the novel properties above set forth, may be produced by introducing the molten zirconium opacified material into a quenching medium maintained between a low temperature of 160° F. and an upper temperature limit which inhibits the production of particles of frit of large size and of such hardness as makes milling of the frit particles exceedingly difficult or impossible. Usually, said upper limit is generally in the neighborhood of 190° F., or this may be considerably greater, depending upon the character of the molten zirconium opacified enamel being treated, including its chemical and physical characteristics, and the character and the amount of the zirconium compound carried by the enamel or ceramic glaze or similar material for increasing the opacifying power of the enamel or ceramic glaze.

It is desired to point out that in the manufacture of fluoride-antimony opacified enamels, the quenching operation is resorted to solely for the purpose of comminuting the frit and so reducing its particle size as to make possible the ready milling of the resulting material in a ball mill to the proper fineness for application to the sheet steel or iron ware. In the production of enamels of this type, it has been found desirable to use as low a quenching temperature as possible, since this produces a finer comminuted frit and also one which is more readily milled.

In carrying out the present invention, the zirconium opacified enamel is preferably treated in accordance with the method and apparatus set forth in Patent No. 2,137,931, granted to the Porcelain Enamel & Manufacturing Company of Baltimore, as assignee of Craven and Knudsen. Referring to the disclosure of said patent, it is there set forth that the maximum desirable quenching temperature ranges from about 120 to 160° F. Very satisfactory results on ordinary enamels are obtained by using a temperature considerably below 120°. If the quenching temperature of an antimony opacified enamel is increased above 150 to 160° F., a partially annealed material is produced which is hard and difficult to mill, and if the temperature is much above 160°, the hardness of the resulting antimony opacified enamel is such as to make milling thereof almost impossible. Further, using a high temperature of quenching for antimony opacified enamels results in the size of the comminuted particles being greatly increased, thereby increasing the time and the expense of the subsequent milling operation. From the experience with the quenching of antimony opacified enamels, one would be led to the conclusion that enamels in general should not be quenched at temperatures above 160 deg. F.

Zirconium opacified enamels, as stated above, depend for a great measure of their opacity upon the recrystallization or devitrification of zirconium compounds in the glassy mixture during the cooling or quenching operation. If the temperature of the quenching fluid is maintained in the neighborhood of 180 deg. F. to 190 deg. F., there results a product of uniformly high opacity which is free from all of the defects which have in the past characterized this type of enamel. If the quenching temperature be decreased below 160 deg. F., the opacity of the resultant enamel frit is decreased from 4%–5%. Further, zirconium opacified enamel frits, and particularly zirconium opacified enamel frits of the compositions hereinafter recited, do not exhibit the properties of forming the large particles and the hard and annealed particles when quenched at temperatures in excess of 160 deg. F. as do the antimony opacified types of enamels when quenched at similar temperatures, said zirconium opacified enamel frits quenched at temperatures as high as 200 deg. F. show no indication of the formation of large particles and hard and annealed particles, thus indicating that even higher temperatures may be satisfactory and satisfactorily used where the composition and the properties of the particular zirconium opacified enamel frit indicates that temperatures higher than 200 deg. F. may be required to obtain the development of maximum opacification properties.

The present invention will be illustrated by the following example:

*Example I*

The raw batch of mixed material is introduced into a smelter which may be of any convenient type commercially in use, but preferably is of the continuous type. Heat is applied and the temperature is held at about between 1950 to 2000° F. or a little higher until the enamel is smelted to a smooth thread; that is, is free from insoluble raw material particles. If the smelter be of the so-called batch type, it is desirable in most cases to further heat treat the molten material for a period of approximately 30 minutes after the melting is complete. In either case, after the enamel composition has been properly melted, it is discharged from the smelter into a quenching pit containing a cooling fluid which is preferably, although not necessarily, water, the temperature of the fluid adjacent to the falling stream of molten material being maintained at about between 180–190° F. Preferably, although not necessarily, the molten enamel flows through an inert heating medium adapted to keep the air from unduly cooling the molten enamel upon its entry into the quenching bath, all as set forth in Craven and Knudsen patent, No. 2,137,931. Preferably, although not necessarily, the molten stream of material passes through a counter flowing stream of quenching medium of the desired temperature, and the quenched material is continuously removed from the bottom of the quenching pit, all as set forth in said patent to Craven and Knudsen. It is desirable that the temperature of the quenching medium be controlled during the quenching period, so that excessive water temperatures are not produced. Preferably, the temperature is controlled by the use of an extra large quenching tank or pit, wherein the volume of the frit introduced into the quenching medium is insufficient to materially alter the temperature of the water during the quenching operation.

The frit prepared as above has the following calculated chemical composition:

| | Per cent |
|---|---|
| $SiO_2$ | 32.75 |
| $Al_2O_3$ | 8.15 |
| $B_2O_3$ | 12.40 |
| $KNaO$ | 14.0 |
| $CaO$ | 5.7 |
| $F_2$ | 8.75 |
| $ZrO_2$ | 13.7 |
| $ZnO$ | 2.75 |
| $P_2O_5$ | 1.75 |
| $TiO_2$ | 0.00 |

The following is an additional example of a frit which has been produced by the method above set forth.

*Example II*

The frit produced had the following calculated chemical composition:

| | Per cent |
|---|---|
| $Si_2O$ | 32.5 |
| $Al_2O_3$ | 8.0 |
| $B_2O_3$ | 12.20 |
| $KNaO$ | 13.75 |
| $CaO$ | 5.3 |
| $F_2$ | 8.50 |
| $ZrO_2$ | 13.5 |
| $ZnO$ | 2.75 |
| $P_2O_5$ | 2.25 |
| $TiO_2$ | .30 |

While the present invention is applicable to frit carrying various percentages of zirconium opacifiers, in general the zirconium constituent and the other constituents may illustratively, but not by way of limitation, vary as follows:

| | Per cent |
|---|---|
| $SiO_2$ | 30.0 to 40.0 |
| $Al_2O_3$ | 7.0 to 9.0 |
| $B_2O_3$ | 12.0 to 13.0 |
| $KNaO$ | 10.0 to 16.0 |
| $CaO$ | 3.5 to 6.0 |
| $F_2$ | 5.0 to 10.0 |
| $ZrO_2$ | 12.0 to 15.0 |
| $ZnO$ | 2.5 to 8.0 |
| $P_2O_5$ | 0.5 to 3.0 |
| $TiO_2$ | 0 to 2.0 |

The present invention may also be carried out using the raw batch compositions set forth in U. S. Patent No. 1,944,938.

The advantageous results produced by the present invention by smelting two batches of similar raw material under exactly similar conditions, and then quenching one at the usual temperature, and then the other at a high temperature in accordance with the present invention are indicated by the following:

Two batches of a raw enamel mix capable of producing the frit set forth in Example I were smelted under similar conditions. The first batch herein designated frit A was quenched at a water temperature of 80° F., while the second batch of the same raw composition smelted under exactly similar conditions was quenched at a temperature of 180° F. to produce the herein designated frit B. The resulting batches of frits A and B were each separately milled with 7% of ball clay, 4 ounces of magnesium carbonate, and 35 pounds of water per 100 pounds of frit, and applied over sheet steel at an application weight of 50 grams per square foot, whereby there was obtained the following diffuse reflectance or opacity:

| | Per cent |
|---|---|
| Frit "A" | 69.5 |
| Frit "B" | 74.0 |

By adding 1½% of the usual opacifier which is usually a zirconium type opacifier to the aforementioned milling mixture, there is obtained opacified enamels having the following diffuse reflectance:

| | Per cent |
|---|---|
| Frit "A" | 74.0 |
| Frit "B" | 78.0 | thereby indicating and demonstrating that the opacity variation persists regardless of treatment after the smelting operation.

A comparison of the opacity of zirconium enamels smelted in accordance with the present invention and the best available antimony type of opacified enamels, when milled with similar opacifier addition; and with the hitherto mentioned antimony opacified enamel milled with 8% of an antimony opacifier, follows:

| Type enamel opacified with— | Percent opacifier | Percent diffuse reflectance at— | |
|---|---|---|---|
| | | 40 gms./sq. ft. | 50 gms./sq. ft. |
| Zirconium compound: | | | |
| Frit "A" | 1½ | 69.0 | 74.0 |
| Frit "B" | 1½ | 74.0 | 78.0 |
| Antimony compound | 1½ | 70.4 | 75.0 |
| Do | 8 | 72.5 | 76.8 |

The data set forth in the above table clearly indicate that frit "A" opacified with zirconium silicate and smelted, and which was not treated in accordance with the present invention, showed an opacity slightly inferior to the antimony enamel with the same opacifier addition, and markedly inferior to the enamel opacified with the antimony compound with the high opacifier addition of 8%. On the contrary, zirconium frit "B," both frits "A" and "B" having been smelted from the enamel set forth in Example I, said zirconium frit "B" having been quenched in accordance with the present invention, is far superior in opacification power as compared to the antimony enamel when milled with similar amounts of mill-added opacifier. Further, frit "B" has a somewhat superior opacification power over the antimony opacified enamel milled with a high percentage of opacifier, namely 8%.

Stated differently, in accordance with the present invention, it is possible to increase and maintain the uniformity of the opacification power or diffuse reflectance of enamel frits and ceramic glazes which derive their opacity by the uniform distribution throughout the glassy matrix of minute crystalloid particles precipitated from supersaturated solution in the molten glass during the quenching of the same by maintaining the temperature of the quenching medium, which is usually water, above 160°, and preferably at a temperature of above 180°, which will inhibit the production of particles of frit of large size and of such hardness as makes milling of the frit particles exceedingly difficult or impossible. In general, as stated, said upper limit is in the neighborhood of 190°, although this may be somewhat greater, as heretofore pointed out. The preferred temperature of quenching the smelted material set forth in Example I is 180°. When the composition is slightly different, the temperature of quenching may be different, either somewhat less than 180° or somewhat greater.

As stated, it is preferred to use the method and apparatus set forth in U. S. Patent No. 2,137,931. However, satisfactory results may be obtained using other methods of quenching and other apparatus, and it is to be clearly understood that the present invention is not limited to any particular method of quenching or any particular apparatus, but is capable of being utilized with any of the prior art methods or with the use of any prior art quenching apparatus.

By quenching the zirconium opacified enamel in the manner set forth, there is produced a uniform dispersion of the crystalloid opacifying aggregate in enamel glass in an amount and with a size of particle best adapted to produce a maximum opacity with zirconium opacified enamels and glazes. Further, the present invention results in the production of uniform opacity between individual smelts or batches of the same frit when quenched in accordance with the invention herein set forth and, as pointed out hitherto, using the prior art temperature of quenching there was a variance of 4 to 7%.

The zirconium opacifying constituent may be any material which will function to opacify, but preferably is a zirconium material containing silica, such as zirconium silicate, or double silicates of zirconium and sodium, or of zirconium and potassium. Zirconium oxide may be used in preference to zirconium silicate $ZrSiO_4$, but since the silicate, that is, zircon, is cheaper than the oxide, it is preferable to use the latter material. These zirconium materials are set forth by way of example and not by way of limitation, and obviously other equivalent zirconium containing compounds may be used.

For a part of the zirconium there may be substituted other materials, such as titanium compounds and the like.

While certain typical enameling compositions containing zirconium opacifier have been herein set forth, it is obvious that these are merely illustrative, and not by way of limitation. In other words, various kinds of vitreous enamels and ceramic glazes containing zirconium-opacifying agents may be treated in accordance with the present invention.

The present invention has been illustrated by the quenching of molten zirconium enamel in water or other aqueous medium. Using this quenching medium, it is obvious that the quenching temperature must be kept below the boiling point of water. The molten zirconium opacified enamel may be cooled and comminuted in a non-aqueous medium, as for example a gaseous medium, and in such case the temperature at which the molten enamel is quenched to cool and comminute the same may be greater than 200° F. or 205° F. The limiting factor is that the enamel must not be quenched at a temperature which will anneal the frit particles and make them so hard as to produce difficulty in milling, or make milling impossible and/or produce particles of frit of large size.

The following data are illustrative of the advantages obtained by quenching the zirconium opacified frit at 160° F. or higher. Before the present discovery was made, a 63,000 pound continuous run producing a zirconium type of enamel was made and the resulting enamel exhibited a variation in opacity from 66.3 to 75.9% or about 9% when applied at 65 grams per sq. ft., which is obviously far beyond any reasonable commercial limit. It is this variance in opacity upon firing which has made it substantially impossible prior to the present invention to use a zirconium opacified enamel.

Using the present invention, a comparable enamel was produced in a 78,000 lb. run, and the enamel showed a variation of only 73.1 to 75.6% when applied at 50 grams per sq. ft., which is a variation of only 2.5%. The average variation between the batches for this latter run was very much less than the maximum. For example, the average basic opacity for this run was 74.5%, so that the deviation of maximum and minimum opacity from the average was in the neighborhood of 1% to 1.5%, which is well within the limits of a commercial enamel and not visible to the unpracticed eye. Stated functionally, the variation in opacity upon firing and refiring of a zirconium opacified enamel quenched at a temperature of 160° or above is such that it is not visible to the unpracticed eye of the average consumer, whereas when the same zirconium type enamel was quenched at lower temperatures there was such a wide variation in opacity between successive portions of the enamel produced in a continuous process that the average consumer could easily see the variation, and so the enamel was not commercial.

What is claimed is:

1. The method of producing opaque zirconium opacified frit comprising introducing zirconium opacified molten frit-forming material into a quenching bath maintained at a temperature between 180° F. and 205° F., whereby there is produced a frit characterized by uniform opacity, said frit maintaining its uniform opacity and covering power upon firing and refiring.

2. The method of producing opaque zirconium opacified frit comprising introducing zirconium opacified molten frit-forming material into a quenching bath maintained at a temperature between 160° F. and 200° F., whereby there is produced a frit characterized by uniform opacity, said frit maintaining its uniform opacity and covering power upon firing and refiring.

3. The method of producing opaque zirconium opacified frit developing its ultimate diffuse reflectance from crystallites dispersed through the frit upon the molten frit-forming material being quenched comprising flowing the molten zirconium opacified frit-forming material through an inert heating medium adapted to prevent the air from unduly cooling the molten material prior to its introduction into a quenching bath and then introducing the so-treated molten frit-forming material into a quenching bath maintained at a temperature between 160° F. and 205° F., said bath temperature producing no substantial annealing of the zirconium opacified frit particles, and providing a vitreous enamel successive batches of which exhibit substantially uniform diffuse reflectance, and which maintain said diffuse reflectance upon firing and refiring.

PAUL C. STUFFT.